United States Patent Office 3,475,923
Patented Nov. 4, 1969

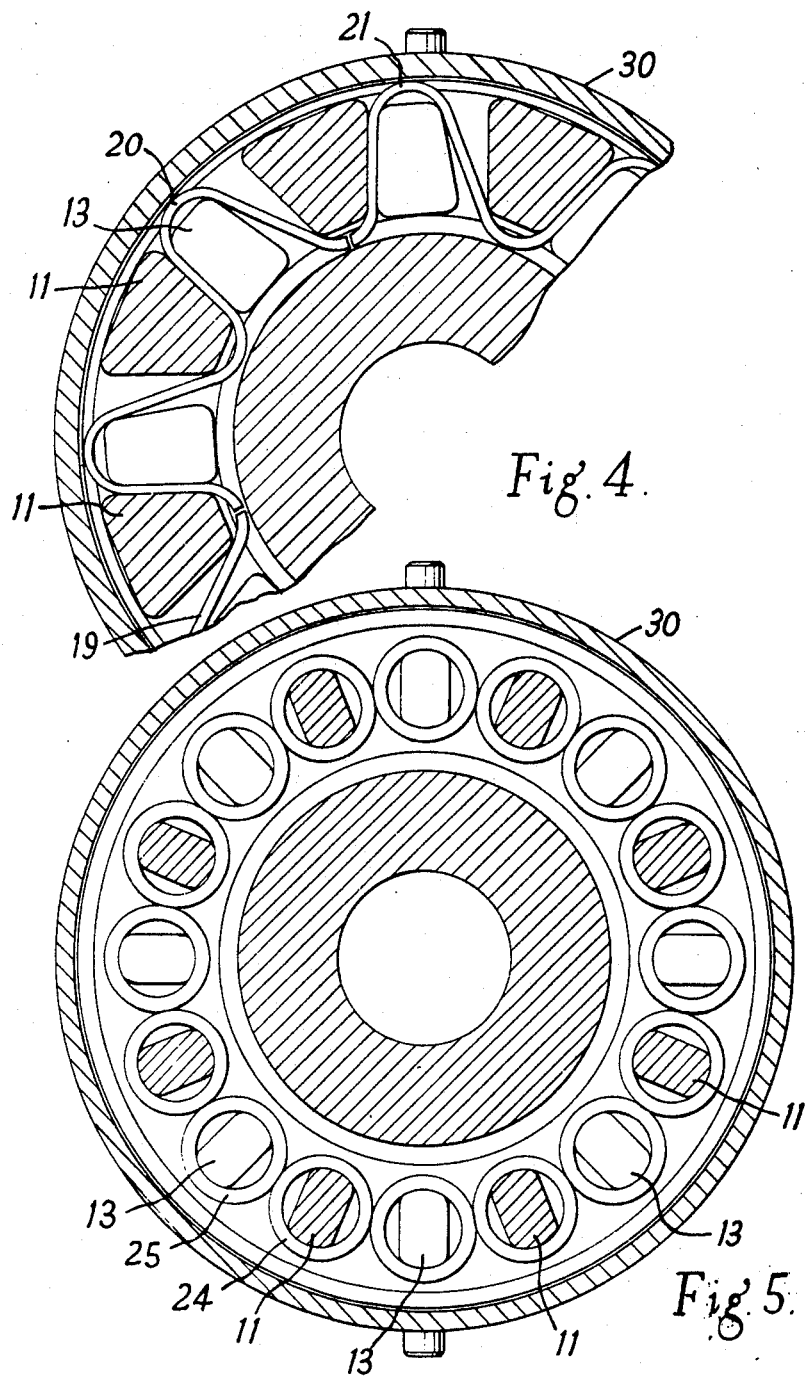

3,475,923
ROTARY COUPLINGS
Iain S. Spence, Dudley, England, assignor to Fabric Bearings Limited, Old Hill, England
Filed Nov. 27, 1967, Ser. No. 685,820
Claims priority, application Great Britain, Nov. 29, 1966, 53,512/66
Int. Cl. F16d 3/64, 3/56
U.S. Cl. 64—14                                    12 Claims

ABSTRACT OF THE DISCLOSURE

A flexible rotary coupling having a driving member with a set of axially extending, evenly spaced projections, and a driven member also with a set of axially extending, evenly spaced projections. The projections are mounted on a ring secured to the driven member by shear bolts. Four like springs of corrugated strip form are so engaged with the projections that projections of one set lie on one side of each strip and projections of the other set lie on the other side of the strip. The strips are progressively bent with increasing torque to a final configuration in which the strips are clamped between the opposing faces on the two sets of projections in alternate ones of the gaps between the projections. Other spring means than corrugated strips may be used.

---

The present invention relates to rotary couplings and is concerned with flexible rotary couplings.

For use in applications such as rolling mills in the steel industry it is common practice to employ flexible rotary couplings which serve to buffer associated apparatus against the full effects of shock loads and reversals of rotation.

For this purpose a number of different proposals have been made and one flexible coupling in wide use employs two rotary members spaced from one another and each provided with auxiliary extending peripheral slots. The gap between the two rotary members is bridged by spring members or a continuous spring member lying in the slots.

Such a coupling has proved to be satisfactory but it requires costly accurate machining and assembly which it is the object of the present invention to avoid or at least reduce.

According to the present invention a rotary coupling comprises a driving member and a driven member each having a set of circumferentially spaced and axially extending projections with the projections of one member spaced from and located in the spaces respectively between, the projections on the other member by spring means lying at least partly in the gaps defined by opposing faces on the two sets of projections, the spring means being adapted to be bent progressively with increasing torque from an initial configuration at zero torque in which the area of contact between the spring means and the said opposing faces in alternate ones of the gaps is relatively small to a final configuration in which the said area of contact is relatively large and the spring means in each of the said alternate gaps is clamped by the said opposing faces whereby positive transmission of torque is enabled. Thus during an initial relative rotation of the two numbers the coupling is resilient and when the final configuration of the spring means is reached the coupling is no longer resilient and the torque-transmission is positive. In general the principal transient shock forces to be handled by a flexible coupling are initial accelerations towards a steady state and initial decelerations towards a steady state. It will be appreciated that this realisation is exploited by the present invention and enables a simplified construction of less exacting specification to be made.

The invention will now be described by way of example, with reference to the accompanying drawings, in which:

FIG. 4 is a cross-section of part of the embodiment of FIG. 1 in which two rotary members are in different positions from those shown in FIG. 3, and FIG. 5 is a cross-section of a second embodiment of the invention.

Figure 1:
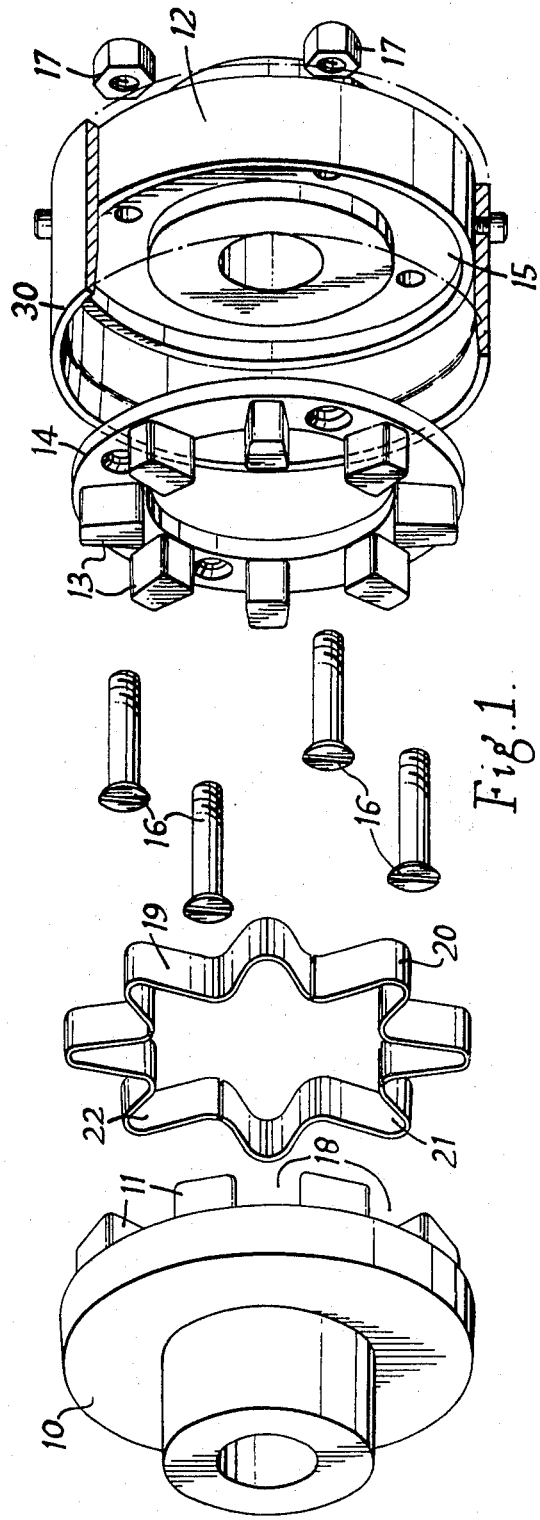
FIG. 1 is an exploded view of one embodiment of the invention.

The coupling shown in FIGS. 1 to 4 comprises a rotary driving member 10 provided with eight circumferentially spaced and axially extending projections 11 and a rotary driven member 12 mounted coaxially with the member 10 and provided with eight circumferentially spaced and axially extending projections 13. The projections 13 are carried on a ring 14 which is located in an annular channel 15 in the member 12 and is affixed to the member 12 by shear bolts 16 with associated nuts 17. The shear bolts limit the torque that can be transmitted through the coupling.

The projections 13 on the member 12 lie in the spaces 18 (FIG. 1) between the projection 11 on the member 10. Location of the projections 13 in the spaces 18 is by spring means comprising four like springs 19–22. It will be seen that the springs are of corrugated form and the slopes between the troughs and crests of the corrugations lie in the gaps 23 between the opposing faces on the projections 11 and 13.

A cylindrical cover 30 is secured to the member 12 by screws and encircles the sets of projections 11 and 13. The tops of the crests of the springs 19–22 are in contact with the inner surface of the cover 30 which serves to retain and shield the springs.

Figure 3:
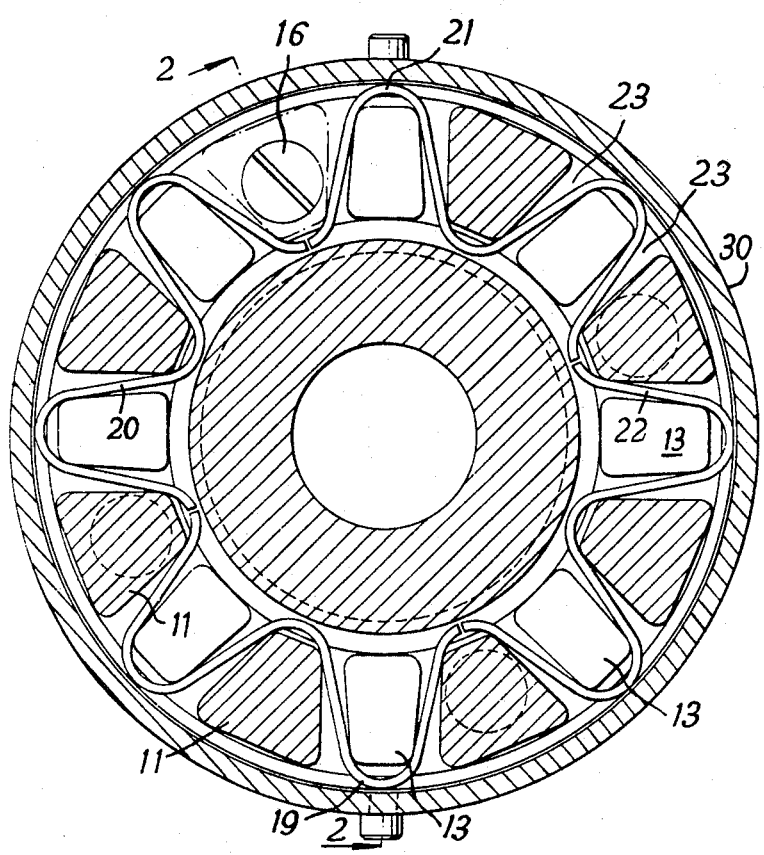
FIG. 3 is a cross-section taken along 3—3 of FIG. 2.

With zero torque, which is the condition shown in FIG. 3 the slopes in the corrugations of the springs extend diagonally across the gaps in which they lie and the area of contact between the springs and the projections 11 and 13 is the small area at each radially inner and outer end of the gaps.

Assuming torque to be applied to the driving member 10 to rotate it clockwise as viewed in FIG. 3, the resilience of the springs permits them to bend and hence permits some relative rotation between the two members to occur. The limit of this relative rotation is shown in FIG. 4 in which alternate gaps between the projections 11 and 13 are closed upon the springs which lie in the gaps whereby the area of contact between the springs and the projections 11 and 13 is a maximum. The slopes of the corrugations in the springs which lie in said alternate gaps are clamped between the projections 11 and 13 whereby the drive through the coupling is no longer resilient and is positive.

It will be appreciated therefore, that sudden changes of load or torque are accommodated at least partially by the resilience of the springs until the conditions of positive drive shown in FIG. 4 is reached.

It will be appreciated that the use of the ring 14 and shear bolts 16 is a matter of choice dependent upon requirements. If desired overload protection can be provided for outside the coupling.

Figure 2:
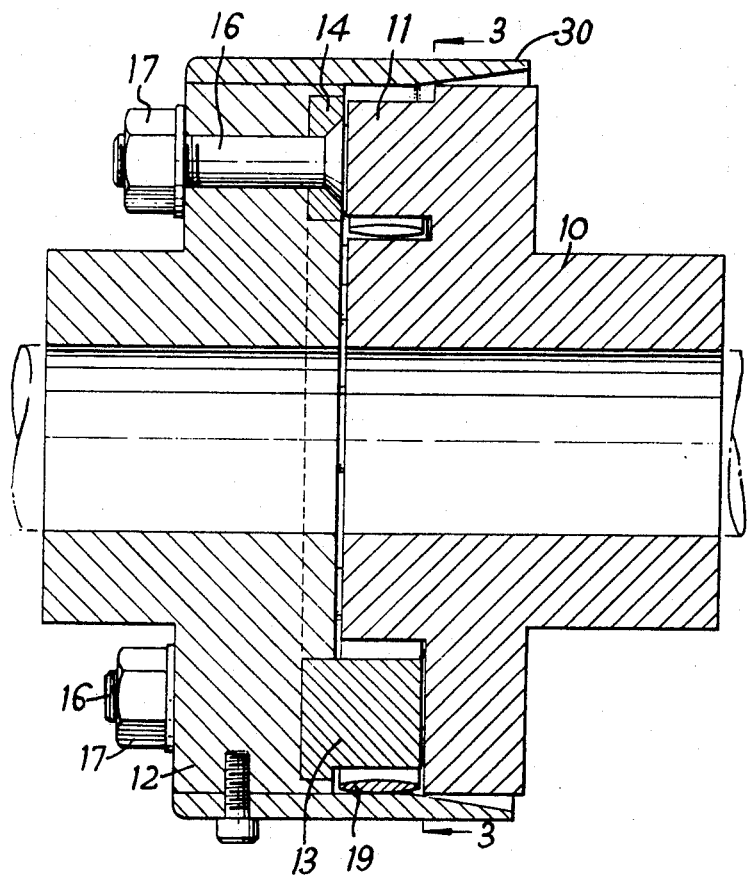
FIG. 2 is a longitudinal cross-section of the embodiment of FIG. 1 and is taken along 2—2 of FIG. 3.

Similarly although the spring means is shown as four springs 19–22 a single spring or other arrangement can be used. For example, each of the four springs 19–22 may be replaced by two separate springs located about respective projections 13 and so shaped that the corrugated form shown in FIGS. 1, 2 and 3 is retained but each crest is separated from its neighbours in the same manner as the pair of adjacent crests at adjacent ends of the springs 19 and 20.

The size of the coupling and number and size of the projections 11 and 13 is dependent upon the maximum torque to be transmitted.

Another embodiment of the invention is shown in cross-section in FIG. 5. Like parts in FIGS. 1–4 and 5 are given the same reference.

In FIG. 5 the springs consist of sleeves of circular-cylindrical shape each projection 11 and 13 having a spring sleeve individual to it such as the sleeves 24 and 25 surrounding projections 11 and 13 respectively. The spring sleeves may be in metal such as spring steel or they may be of synthetic material such as nylon.

The condition shown in FIG. 5 is the condition of zero torque. When torque is applied the sleeves 24 and 25 are distorted by the compression applied to them by the projections 11 and 13 until a limiting condition is reached in which the sleeves are clamped between opposing faces of the projections 11 and 13 and the drive becomes positive.

What I claim is:
1. A rotary coupling comprising
   (a) a driving member,
   (b) a driven member,
   (c) a set of circumferentially spaced and axially extending projections on the said driving member,
   (d) a set of circumferentially spaced and axially extending projections on the said driven member, and
   (e) limited torque spring means,
the said projections of one member being spaced from and located in the spaces respectively between the said projections on the other member by the said spring means which means lie at least partly in the gaps defined by opposing faces on the said two sets of projections to be bent progressively with increasing torque from an initial configuration at zero torque in which the area of contact between the said spring means and the said opposing faces in alternate ones of the gaps is relatively small to a final configuration in which the said area of contact is relatively large and the spring means in each of the said alternate gaps is clamped by the said opposing faces and thereby prevented from being further deformed.

2. A rotary coupling as claimed in claim 1, wherein the spring means includes at least one strip of resilient material bent to form crests and troughs and so engaged with the projections that projections of one set lie on one side of the strip and projections of the other set lie on the other side of the strip.

3. A rotary coupling as claimed in claim 1, wherein the spring means includes a plurality of spring members located about respective projections.

4. A rotary coupling as claimed in claim 1, wherein the driven member includes a cover which encircles the said sets of projections and retains the spring means.

5. A rotary coupling as claimed in claim 1, wherein one of the said sets of projections is secured to its respective coupling member by means of shear bolts.

6. A rotary coupling comprising
   (a) a driving member,
   (b) a driven member,
   (c) a set of circumferentially spaced and axially extending projections on the said driving member,
   (d) a set of circumferentially spaced and axially extending projections on the said driven member,
   (e) a plurality of strips of resilient material, each strip being bent to form crests and troughs and engaged with the said projections, the projections of one set lying on one side of the strip and the projections of the other set lying on the other side of the strip, the projections of one member being spaced from and located in the spaces respectively between the projections on the other member by the said strips.

7. A rotary coupling as claimed in claim 6, wherein the driven member includes a cover which encircles the sets of projections and retains the said strips.

8. A rotary coupling as claimed in claim 7, wherein one of the sets of projections is secured to its respective coupling member by means of shear bolts.

9. A rotary coupling comprising
   (a) a driving member,
   (b) a driven member,
   (c) a set of circumferentially spaced and axially extending projections on the said driving member,
   (d) a set of circumferentially spaced and axially extending projections on the said driven member,
   (e) a plurality of limited torque axially extending hollow cylinders of resilient material, each cylinder being located on a respective one of the said projections, and adjacent cylinders being in contact with one another, the projections of one member being spaced from and located in the spaces respectively between the projections on the other member by the said cylinders, the said projections having opposing faces which define gaps between adjacent projections in which gaps parts of the said adjacent cylinder are disposed to be bent progressively with increasing torque from an initial configuration at zero torque to a final configuration in which those of the said parts in alternative ones of the gaps are clamped by the said opposing faces.

10. A rotary coupling as claimed in claim 9, wherein the said resilient material is spring steel.

11. A rotary coupling as claimed in claim 9, wherein the said resilient material is a plastics material.

12. A rotary coupling as claimed in claim 9, wherein one set of projections is secured to its respective coupling member by means of shear bolts.

References Cited

UNITED STATES PATENTS

| | | | |
|---|---|---|---|
| 1,353,677 | 9/1920 | Tomlinson | 64—14 |
| 1,849,174 | 3/1932 | Carter | 64—28 |
| 2,025,824 | 12/1935 | Ricefield | 64—14 |
| 2,200,641 | 5/1940 | Ricefield | 64—14 |
| 2,733,580 | 2/1956 | Miller | 64—15 |
| 2,737,033 | 3/1956 | Bendall | 64—14 |
| 2,893,224 | 7/1959 | Schmitter | 64—14 |
| 2,924,082 | 2/1960 | Reich | 64—10 X |
| 3,246,483 | 4/1966 | Schmitter | 64—28 |

FOREIGN PATENTS 690,228 6/1930 France.

HALL C. COE, Primary Examiner

U.S. Cl. X.R.

64—15